United States Patent
Bolz et al.

(10) Patent No.: US 9,767,600 B2
(45) Date of Patent: Sep. 19, 2017

(54) TARGET INDEPENDENT RASTERIZATION WITH MULTIPLE COLOR SAMPLES

(71) Applicant: NVIDIA CORPORATION, Santa Clara, CA (US)

(72) Inventors: Jeffrey A. Bolz, Austin, TX (US); Mark J. Kilgard, Austin, TX (US); Henry Packard Moreton, Woodside, CA (US); Rui M. Bastos, Porto Alegre (BR); Eric B. Lum, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 205 days.

(21) Appl. No.: 14/019,344

(22) Filed: Sep. 5, 2013

(65) Prior Publication Data
US 2014/0267366 A1    Sep. 18, 2014

Related U.S. Application Data

(60) Provisional application No. 61/778,272, filed on Mar. 12, 2013.

(51) Int. Cl.
*G06T 11/20* (2006.01)
*G06T 15/50* (2011.01)

(52) U.S. Cl.
CPC .......... *G06T 15/503* (2013.01); *G06T 11/203* (2013.01)

(58) Field of Classification Search
None
See application file for complete search history.

(56) References Cited

U.S. PATENT DOCUMENTS

| | | | | |
|---|---|---|---|---|
| 8,044,956 B1* | 10/2011 | Kilgard | ................. | G06T 15/503 345/426 |
| 2002/0196251 A1* | 12/2002 | Duluk et al. | .................. | 345/420 |
| 2006/0033743 A1* | 2/2006 | Morein | ................. | G06T 15/005 345/501 |
| 2007/0285417 A1* | 12/2007 | Prokopenko et al. | ........ | 345/419 |
| 2008/0225049 A1* | 9/2008 | Fowler | .................... | G06T 15/40 345/422 |
| 2008/0273029 A1* | 11/2008 | Brennan | ............... | G06T 15/405 345/420 |
| 2011/0285747 A1* | 11/2011 | Kilgard | ........................ | 345/613 |

* cited by examiner

*Primary Examiner* — James A Thompson
(74) *Attorney, Agent, or Firm* — Artegis Law Group, LLP

(57) ABSTRACT

A graphics processing pipeline within a parallel processing unit (PPU) is configured to perform path rendering by generating a collection of graphics primitives that represent each path to be rendered. The graphics processing pipeline determines the coverage of each primitive at a number of stencil sample locations within each different pixel. Then, the graphics processing pipeline reduces the number of stencil samples down to a smaller number of color samples, for each pixel. The graphics processing pipeline is configured to modulate a given color sample associated with a given pixel based on the color values of any graphics primitives that cover the stencil samples from which the color sample was reduced. The final color of the pixel is determined by downsampling the color samples associated with the pixel.

27 Claims, 6 Drawing Sheets

TARGET INDEPENDENT RASTERIZATION WITH MULTIPLE COLOR SAMPLES

CROSS-REFERENCE TO RELATED APPLICATIONS

This application claims priority benefit to United States provisional patent application titled, "Target Independent Rasterization With Multiple Color Samples," filed on Mar. 12, 2013, and having Ser. No. 61/778,272. The related application is also hereby incorporated herein by reference in its entirety.

BACKGROUND OF THE INVENTION

Field of the Invention

Embodiments of the present invention relate generally to graphics processing and, more specifically, to target-independent rasterization with multiple color samples.

Description of the Related Art

Path rendering is a graphics processing paradigm where a two-dimensional graphics scene is defined by a collection of "paths." Each path is generally a mathematical description of a line, shape, or other geometric construct. Each such mathematical description may be resolved into pixels at an arbitrary resolution, and so the description of the scene to render is independent of the actual resolution of a target display device. For this reason, certain path rendering approaches may be referred to as "resolution-independent 2D graphics."

A computer system configured to implement conventional path rendering typically relies on a central processing unit (CPU) to resolve a collection of paths into pixels. In doing so, the CPU generally implements a scan-line rasterization approach where path coverage may be assessed by an analytic approximation of coverage based what fraction of a pixel's extent intersects the path and one or more sub-pixel scan-lines. The CPU renders a pixel based on a path by performing two general steps: first, the CPU identifies a path's fractional coverage for each pixel fully or partially covered by the path. Second, the CPU shades the pixel based on the identified fractional coverage for each pixel. With this conventional approach, a given pixel is typically assigned a color value that is derived from any paths covering that sample. Thus, each pixel needs to maintain just a single cumulative color. The disadvantage of the CPU-based scan-line approach is the scan-line rasterization process requires sequential scanning of scan-lines, making it less parallel that GPU-based rasterization algorithms.

CPU-based path rendering has recently given way to graphics processing unit (GPU)-based path rendering. With GPU-based path rendering, the highly parallel architecture of modern GPUs is leveraged to accelerate conventional path rendering by parallelizing the coverage assessment and pixel shading steps discussed above through various techniques. However, the conventional path rendering approach discussed previously must be adapted for execution on GPUs due to certain differences in the multisampling technique performed by GPUs.

In particular, modern GPUs typically sample pixels at multiple locations (with 4 samples typical of much 3D rendering) to assess coverage to minimize edge antialiasing for polygonal 3D rendering. Path rendering demands increased antialiasing quality so the number of coverage samples must be increased to 8 or 16 in order to generate rendered images with a quality that is comparable to CPU-based approaches. However, the corresponding number of color samples typically cannot be increased to such a high number, because color samples are generally quite large compared to coverage samples and modern GPUs may lack the per-pixel memory storage and bandwidth to store and update 8 or 16 color samples per pixel. In the absence of a GPU-based approach with reasonable memory storage and bandwidth requirements for acceptable quality, systems for path rendering may simply forego the benefits of GPU-acceleration of path rendering.

Accordingly, what is needed in the art is an improved technique for GPU-based path rendering.

SUMMARY OF THE INVENTION

One embodiment of the present invention sets forth a computer-implemented method for rendering a graphics image, including identifying a first set of samples that reside within a pixel, where each sample in the first set of samples is associated with one or more state values, determining coverage of the first set of samples relative to a graphics primitive, reducing the first set of samples to a second set of samples, where the second set of samples includes fewer samples than the first set of samples, and determining a color value for each sample in the second set of samples based on the coverage of the first set of samples relative to the graphics primitive and a color value associated with the graphics primitive.

One advantage of the disclosed technique is that the accuracy with which a path may be rendered is preserved by allowing a relatively large number of stencil samples, without needing to sacrifice an excessive amount of per-pixel memory storage and bandwidth to support a similarly large number of color samples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
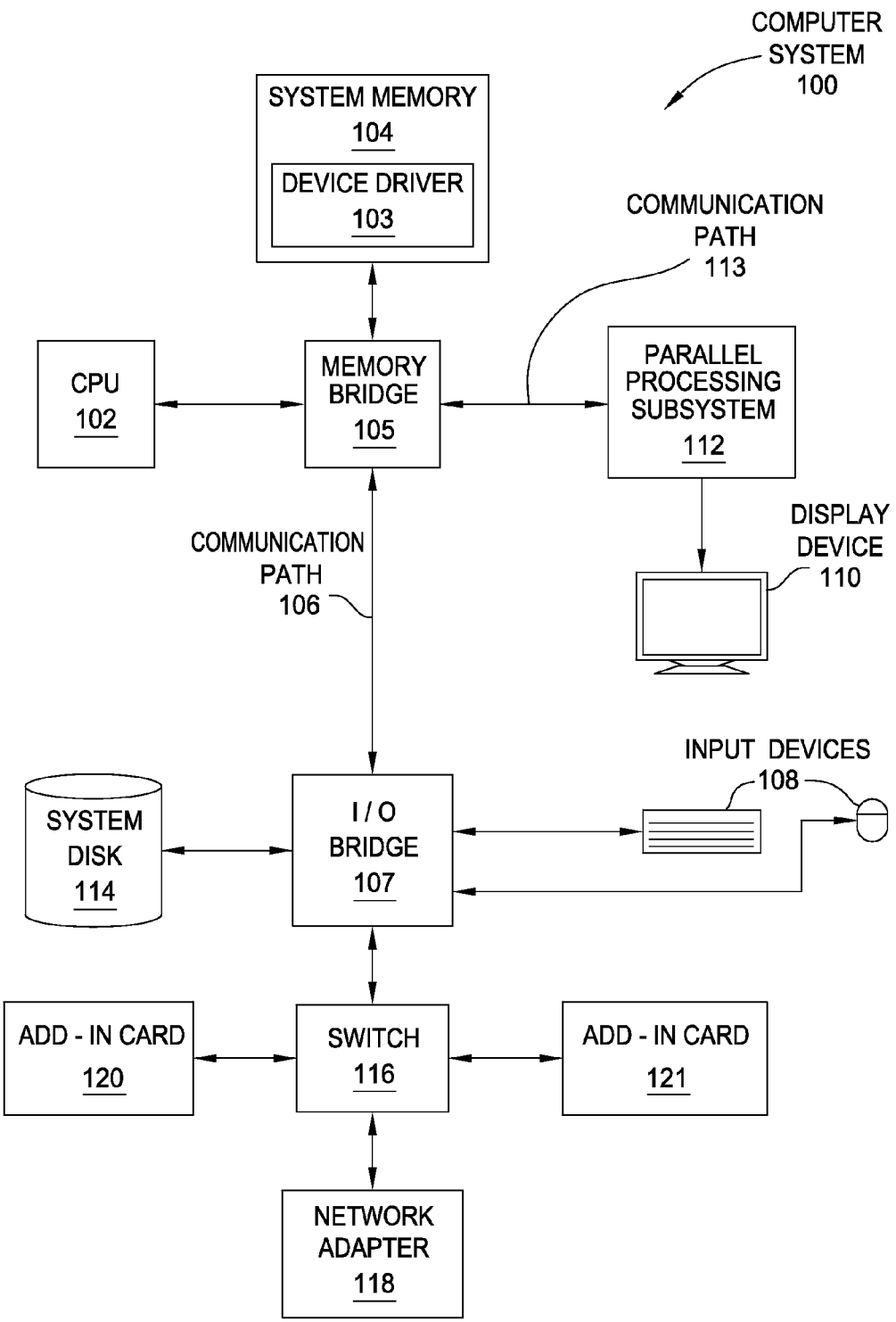
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
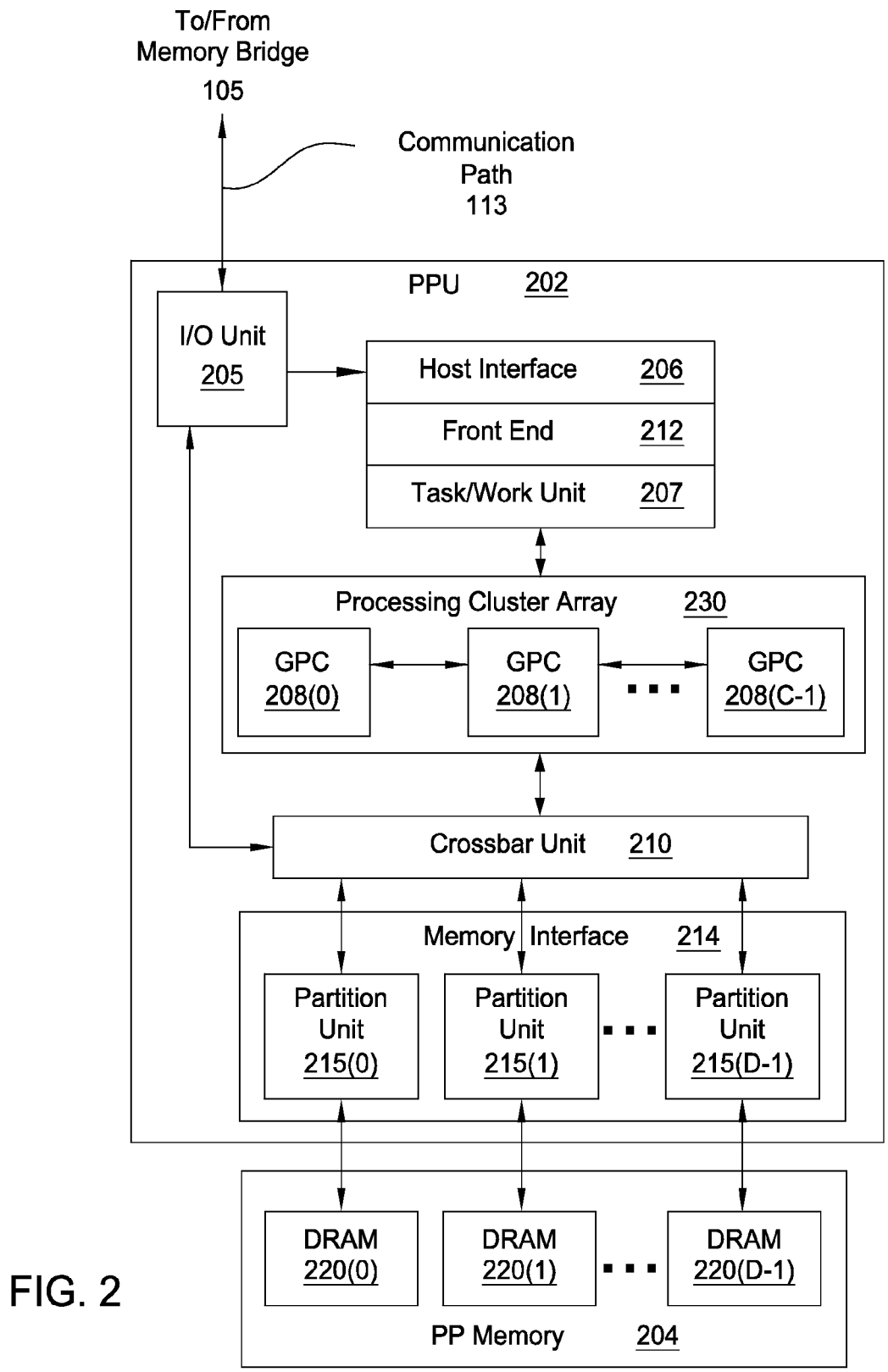
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Graphics Pipeline Architecture

Figure 3:
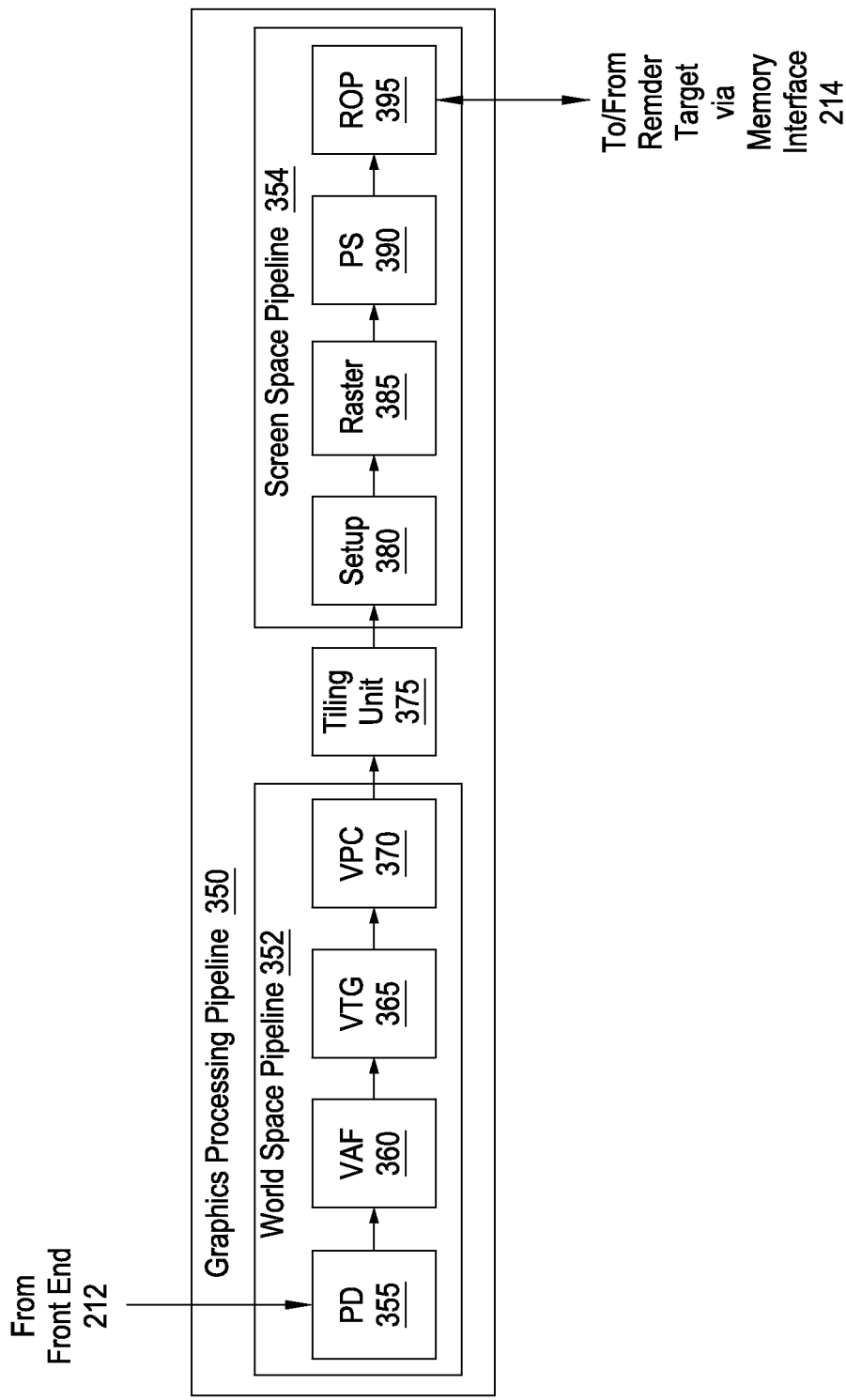
FIG. 3 is a conceptual diagram of a graphics processing pipeline that may be implemented within the parallel processing unit of FIG. 2, according to one embodiment of the present invention.

FIG. 3 is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, a streaming multiprocessor (not shown) within one of GPCs 208 of FIG. 2 could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Target Independent Rasterization with Multiple Color Samples

Graphics processing pipeline 350 may be configured to implement a wide variety of different rendering techniques, including, broadly speaking, raster graphics techniques as well as vector graphics techniques. In the context of this disclosure, graphics processing pipeline 350 is specifically configured to implement a path rendering approach to vector graphics. In this approach, a graphics scene is defined by a collection of paths. Each path is a geometric construct that may be defined by a mathematical description. For example, a given path could be a segment of an ellipse that may be defined based on the mathematical equation for an ellipse. Elements within graphics processing pipeline 350 are configured to render paths into pixels with an arbitrary resolution.

When graphics processing pipeline 350 is configured to perform path rendering, the sequence of processing stages described above may be adapted to implement a path rendering approach known as "stencil then cover" (StC). With an StC approach, graphics processing pipeline 350 first generates a collection of graphics primitives that represent each path to be rendered. For example, graphics processing pipeline 350 could generate a sequence of triangles that represents an elliptical arc. Then, graphics processing pipeline 350 determines the coverage of each graphics primitive at a collection of different stencil sample locations associated with each different pixel. For example, graphics processing pipeline 350 could determine some or all of the stencil samples are covered by a triangle. Graphics processing pipeline 350 may then shade each pixel based on the covered stencil samples, a number of per-pixel color samples, and color values associated with graphics primitives covering those stencil samples.

More specifically, graphics processing pipeline 350 is configured to shade a given pixel by reducing a number N of stencil samples down to a smaller number M of color samples. Then, graphics processing pipeline 350 modulates those color samples based on the color of the graphics primitives that cover any of the associated stencil samples. Graphics processing pipeline 350 determines the final color value for the pixel by combining the M color samples. With this approach, graphics processing pipeline 350 is capable of performing path rendering with a relatively large number of stencil samples (e.g. 16), while limiting the number of color samples to a manageable number (e.g., 4). Accordingly, graphics processing pipeline 350 may preserve the accuracy with which each path may be rendered, without sacrificing an excessive amount of per-pixel memory to support a large number of color samples. The general approach described thus far is described in greater detail, in stepwise fashion, below in conjunction with FIGS. 4A-4B.

Figure 4A:
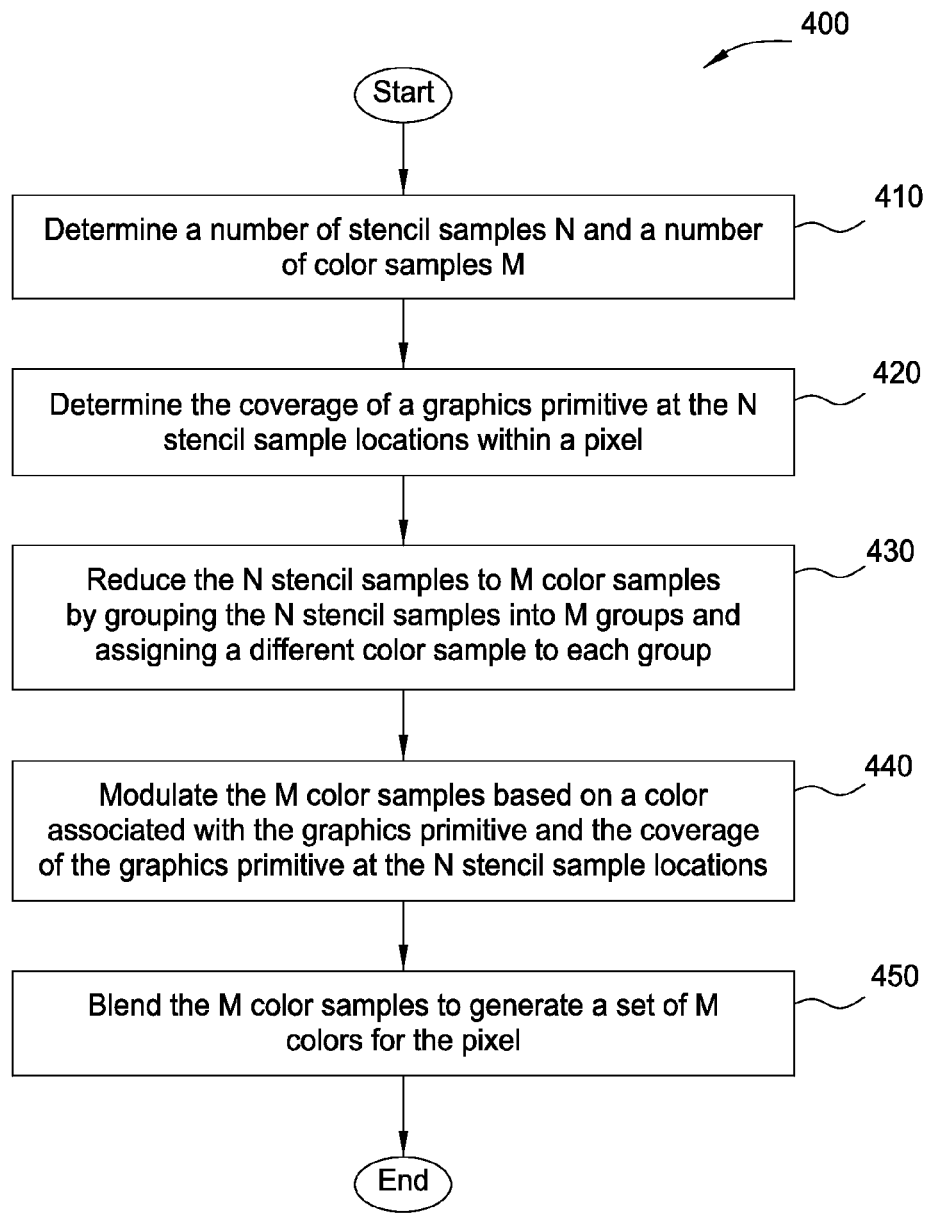
FIG. 4A is a flow diagram of method steps for shading a pixel by reducing a larger number of stencil samples to a smaller number of color samples, according to one embodiment of the present invention.

FIG. 4A is a flow diagram of method steps shading a pixel by reducing a larger number of stencil samples to a smaller number of color samples, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 410, where graphics processing pipeline 350 of FIG. 3 determines a number of stencil samples N and a number of color samples M for each pixel that is to be rendered. M and N are integer values, where M is less than N and generally an even multiple of N. N and M may be defined in software (e.g., driver 103 or another software application) and provided to graphics processing pipeline 350 when graphics processing pipeline 350 is initially configured to perform path rendering. The N stencil samples reflect locations within a given pixel where coverage of a graphics primitive may be evaluated. The M color samples reflect M different colors that may be present within the pixel at a given stencil sample location. In one embodiment, setup 380 within graphics processing pipeline 350 is configured to perform step 410. Once N and M are determined, graphics processing pipeline 350 may then allocate a stencil buffer and depth buffer with N stencil samples and M color samples per pixel.

At step 420, graphics processing pipeline 350 determines the coverage of a graphics primitive at the N stencil sample locations within a pixel. The graphics primitive may be a triangle, polygon, or other geometric construct generated to represent a portion of a path that is to be rendered. The particular locations of each different stencil sample may be defined in software and retrieved when graphics processing pipeline 350 is initially configured. In one embodiment, rasterizer 385 within graphics processing pipeline 350 is configured to perform step 420. In performing step 420, graphics processing pipeline 350 may also determine coverage of the graphics primitive by performing early or late depth and/or stencil tests, analyzing a sample mask output from PS 390, or performing an alpha to coverage operation with the N stencil samples.

At step 430, graphics processing pipeline 350 reduces the N stencil samples to M color samples by grouping the N stencil samples into M groups, then assigning a different color sample to each different group. Graphics processing pipeline 350 may be configured with a particular mapping between stencil sample locations and color samples. For example, graphics processing pipeline 350 could be configured so that the stencil samples within a given region of a pixel correspond to a single color sample. An exemplary mapping between stencil samples and color samples is described in greater detail below in conjunction with FIG. 5.

At step 440, graphics processing pipeline 350 modulates the M color samples based on a color value associated with the graphics primitive and the coverage of the graphics primitive at the N stencil sample locations, as determined at step 420. In performing step 440, graphics processing pipeline 350 implements a specific technique for each different color sample, as described in greater detail below in conjunction with FIG. 4B.

Figure 4B:
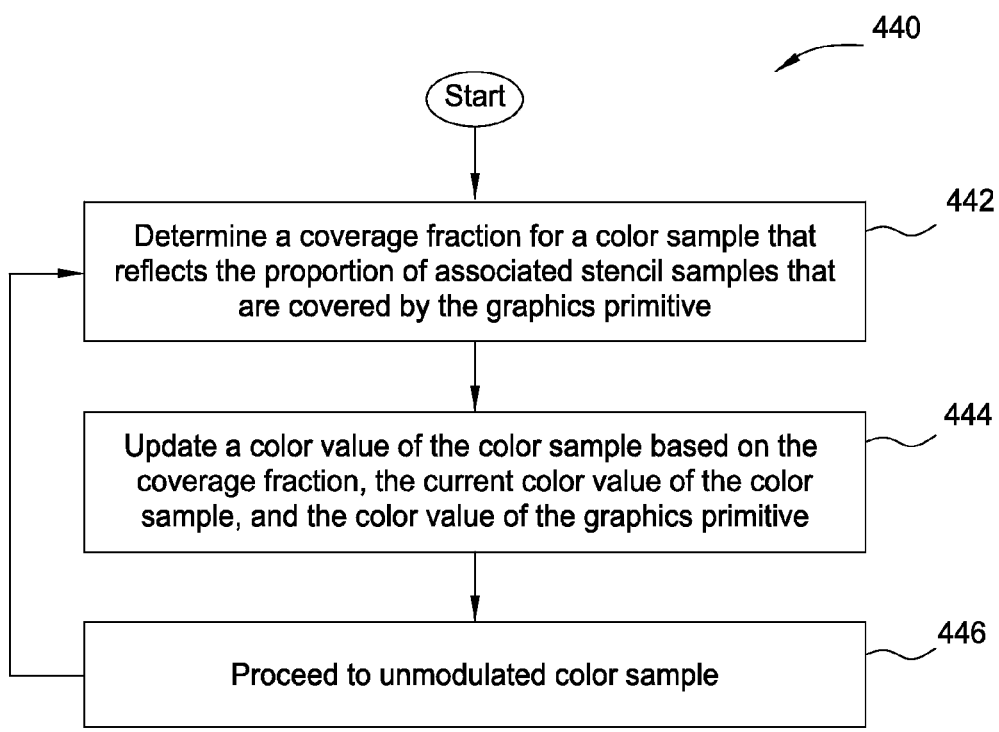
FIG. 4B is a flow diagram of method steps for modulating a color sample associated with a set of stencil samples, according to one embodiment of the present invention.

Referring now to FIG. 4B, FIG. 4B is a flow diagram of method steps for modulating a color sample associated with a set of stencil samples, according to one embodiment of the present invention. Although the method steps are described in conjunction with the systems of FIGS. 1-4A, persons skilled in the art will understand that any system configured to perform the method steps, in any order, is within the scope of the present invention.

As shown, step 440 of the method 400 includes steps 442, 444, and 446, which may be performed iteratively when step 440 is performed. At step 442, graphics processing pipeline 350 determines a coverage fraction for a color sample that reflects the proportion of associated stencil samples that are covered by the graphics primitive. For example, graphics processing pipeline 350 could determine that two stencil samples are covered by the graphics primitive, out of a group of 4 stencil samples associated with a particular color sample. In this example, the coverage fraction would be ½.

At step 444, graphics processing pipeline 350 updates the color value of the color sample based on the coverage fraction, the current color value of the color sample, and the color value of the graphics primitive. The current color value of the color sample may have a default value, or may have a value that was previously computed based on the color of a different graphics primitive processed via the method 400. In one embodiment, graphics processing pipeline 350 updates the color value of the color sample as: new sample color=current sample color*alpha value of sample*coverage fraction+(1−coverage fraction*alpha value of graphics primitive)*graphics primitive color. Graphics processing pipeline 350 may also implement step 444 to perform a blend operation, described in greater detail below in conjunction with Step 450 of the method 400.

At step 446, graphics processing pipeline 350 proceeds to an unmodulated color sample and repeats step 440 of the method 400, as needed, until each of the M color samples has been modulated.

Referring back now to FIG. 4A, at step 450, graphics processing pipeline 350 blends the M color samples to generate a set of M colors for the pixel. Graphics processing pipeline 350 may implement any technically feasible blending approach in order to generate the colors for the pixel. In situations where the M color samples are identical, e.g. when a graphics primitive completely covers the pixel, then graphics processing pipeline 350 may allow ROP 395 to reduce the overall bandwidth through frame buffer color compression techniques relying on all M samples having the identical color. In such a case, graphics processing pipeline 350 may simply write a compressed version of the graphics primitive color to memory for the pixel or, alternatively, blend the color of the graphics primitive with a preexisting pixel color that is stored in memory.

When all graphics primitives associated with the pixel have been processed, and the M color samples modulated and/or blended for each such graphics primitive, graphics processing pipeline 350 may then downsample the M color samples to generate the final color of the pixel. The resulting downsampled image is typically displayed on display device 110 but could also be used by pipeline 350 for further rendering or transferred to other storage such as system memory 104.

Graphics processing pipeline 350 generally implements the method 400 for each different pixel associated with a graphics scene being rendered. In addition, graphics processing pipeline 350 may rely on multiple different threads of execution in order to perform the method 400 for different pixels in parallel with one another. Further, graphics processing pipeline 350 may implement more than one thread to perform the method 400 for a given pixel. For example, graphics processing pipeline 350 could execute a different parallel thread when modulating each different color sample associated with a single pixel. Graphics processing pipeline 350 may also implement one thread to modulate a first group of color samples and another thread to modulate a second group of color samples. As a general matter, the techniques described herein may be distributed to different execution threads according to any technically feasible parallel processing model.

The path rendering techniques described above are also described by way of example below in conjunction with FIG. 5.

Figure 5:
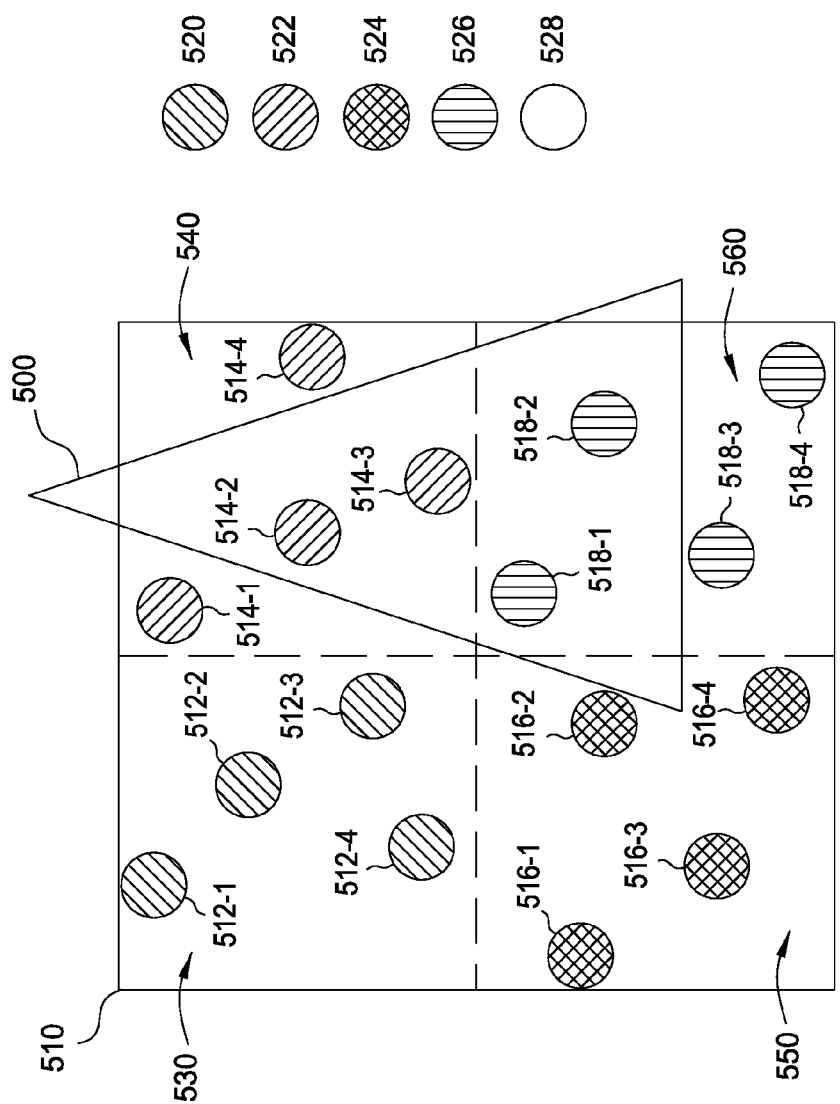
FIG. 5 is a conceptual diagram illustrating an exemplary graphics primitive covering a subset of stencil samples within an exemplary pixel, according to one embodiment of the present invention.

FIG. 5 is a conceptual diagram illustrating an exemplary graphics primitive 500 covering a subset of stencil samples within an exemplary pixel 510, according to one embodiment of the present invention. As shown, pixel 510 includes stencil samples 512 that reside within upper-left quadrant 530, stencil samples 514 that reside within upper-right quadrant 540, stencil samples 516 that reside within lower-left quadrant 550, and stencil samples 518 that reside within lower-right quadrant 560. FIG. 5 also shows color samples 520, 522, 524, and 526 associated with pixel 510, as well as a color value 528 that represents the downsampled color of graphics primitive 500.

As discussed, graphics processing pipeline 350 is configured to identify N stencil sample locations. In the example discussed herein, N=16. The particular locations of the stencil samples are typically configurable and fixed across all pixels to be rendered, although other techniques for selecting stencil sample locations are also conceivable. Graphics processing pipeline 350 may be configured to identify the locations of the 16 stencil samples shown in FIG. 5 when performing step 410 of the method 400. Graphics processing pipeline 350 may also be configured to generate or allocate the color samples shown in FIG. 5 when performing step 410 of the method 400.

As also shown, graphics primitive 500 partially covers pixel 510. Graphics processing pipeline 350 is configured to determine the coverage of graphics primitive 500 on pixel 510 by determining whether each different stencil sample falls inside or outside of the boundary of graphics primitive 500. For example, stencil sample 512-4 falls outside of the boundary of graphics primitive 500, and so graphics processing pipeline 350 would determine that stencil sample 512-4 is not covered by graphics primitive 500. Conversely, stencil sample 518-1 falls within the boundary of graphics primitive 500, and so graphics processing pipeline 350 would determine that stencil sample 518-1 is covered by graphics primitive 500. In FIG. 5, stencil samples 514-2, 514-3, 518-1, and 518-2 are covered by graphics primitive 500, while the remaining stencil samples are not covered. Graphics processing pipeline 350 may determine coverage in this fashion when performing step 420 of the method 400.

Once coverage is determined, graphics processing pipeline 350 reduces the N=16 stencil samples down to M=4 color samples. In doing so, graphics processing pipeline 350 groups stencil samples together based on location and then assigns a different color sample to each group. In the example shown in FIG. 5, graphics processing pipeline 350 is configured to associate M=4 color samples with pixel 510, and so graphics processing pipeline 350 divides pixel 510 into M=4 quadrants, as is shown. Then, graphics processing pipeline 350 associates stencil samples within each different quadrant with a different color sample. As shown, stencil samples 512 within quadrant 530 are associated with color sample 520, stencil samples 514 within quadrant 540 are associated with color sample 522, stencil samples 516 within quadrant 550 are associated with color sample 524, and stencil samples 518 within quadrant 560 are associated with color sample 526. Graphics processing may reduce the N stencil samples to M color samples by implementing step 430 of the method 400.

Graphics processing pipeline 350 then modulates each of the color samples based on color value 528 of graphics primitive 500 and the coverage of graphics primitive 500 at the different stencil sample locations. In modulating a particular color sample, graphics processing pipeline 350 determines a coverage fraction for the color sample based on the associated stencil samples, similar to step 442 of step 440. Then, graphics processing pipeline 350 updates the value of the color sample based on the coverage fraction, the current value of the color sample, and the color value 528 of graphics primitive 500, similar to step 444 of step 440.

More specifically, when modulating color sample 522, graphics processing pipeline 350 determines that stencil samples 514-2 and 514-3, which are associated with color sample 522, are covered by graphics primitive 500, while stencil samples 514-1 and 514-2, also associated with color sample 522, are not covered. Thus, two out of the four stencil samples associated with color sample 522 are covered, resulting in a coverage fraction of ½. Graphics processing pipeline 350 may then update color sample 522 based on the current value of color sample 522, color value 528 of graphics primitive 500, and the coverage fraction of ½.

In situations where a given group of stencil samples associated with a particular color sample are not covered by graphics primitive 500, graphics processing pipeline 350 need not update that particular color sample. Alternatively, when a given group of stencil samples associated with a particular sample are entirely covered by graphics primitive 500, graphics processing pipeline 350 may simply update the color sample to equal color value 528. In addition, if all stencil samples within the pixel 510 are covered by graphics primitive 500 (e.g., graphics primitive 500 is much larger than pixel 510), then graphics processing pipeline 350 may simply write a compressed version of color value 528 directly to a memory region associated with pixel 510 or blend color value 528 with a preexisting color associated with the pixel.

Once graphics processing pipeline 350 has modulated all of the color samples associated with pixel 510, graphics processing pipeline 350 then blends those color samples to generate a final color for pixel 510. Graphics processing pipeline 350 may perform this blending operation by implementing step 450 of the method 400. Graphics processing pipeline 350 is configured to implement the aforementioned techniques multiple different times for each pixel that is to be rendered, and may implement those techniques in parallel with one another, via parallel execution threads, in any technically feasible fashion.

Persons skilled in the art will recognize that the example described above in conjunction with FIG. 5 represents just one possible implementation of the general techniques described above in conjunction with FIGS. 4A-4B. In particular, graphics processing pipeline 350 could cause pixel 510 to include any number N of different stencil samples, and be associated with any number M of different color samples, provided that M is less than N. In addition, graphics processing pipeline 350 could divide pixel 510 into any number of regions and group stencil samples according to those regions. Graphics processing pipeline 350 could also implement alternative techniques for reducing the number of stencil samples to the lesser number of color samples. Graphics processing pipeline 350 could, for example, cluster the stencil samples together via a clustering algorithm and then assign each cluster a color sample. As a general matter, the approach outlined in FIGS. 4A-4B may be implemented in any technically feasible fashion.

In sum, a graphics processing pipeline within a parallel processing unit (PPU) is configured to perform path rendering by generating a collection of graphics primitives that represent each path to be rendered. The graphics processing pipeline determines the coverage of each primitive at a number of stencil sample locations within each different pixel. Then, the graphics processing pipeline reduces the number of stencil samples down to a smaller number of color samples, for each pixel. The graphics processing pipeline is configured to modulate a given color sample associated with a given pixel based on the color values of any graphics primitives that cover the stencil samples from which the color sample was reduced. The final color of the pixel is determined by combining the color samples associated with the pixel.

Advantageously, the PPU may preserve the accuracy with which each path may be rendered by allowing a relatively large number of stencil samples, without sacrificing an excessive amount of per-pixel memory storage and bandwidth to support a similarly large number of color samples. By conserving per-pixel memory storage and bandwidth in this fashion, additional power savings may also be realized because the PPU may store far less data than would be stored in a conventional approach.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for rendering a graphics image, the method comprising:
   identifying a first set of stencil samples that reside within a pixel, wherein each stencil sample in the first set of stencil samples is associated with one or more state values;
   determining coverage of the first set of stencil samples relative to a graphics primitive;
   grouping the first set of stencil samples into a set of sample groups, wherein the number of sample groups included in the set of sample groups is less than the number of samples included in the first set of stencil samples; and
   determining a color value for each sample group included in the set of sample groups based on the coverage of the first set of stencil samples relative to the graphics primitive and a color value associated with the graphics primitive.

2. The computer-implemented method of claim 1, wherein determining coverage of the first set of stencil samples comprises identifying samples in the first set of stencil samples that are covered by the graphics primitive.

3. The computer-implemented method of claim 1, wherein reducing the first set of stencil samples to the second set of color samples comprises:
   identifying a first region within the pixel;
   determining a first subset of the first set of stencil samples that resides within the first region; and
   generating a first color sample to be included in the second set of color samples that corresponds to the first subset.

4. The computer-implemented method of claim 3, further comprising blending color values associated with the first color sample to determine a color value for the first color sample by:

determining a coverage fraction for the first subset that reflects a fraction of samples included in the first subset that are covered by the graphics primitive; and modifying a color value associated with the first color sample based on the coverage fraction and the color value associated with the graphics primitive.

5. The computer-implemented method of claim 1, further comprising downsampling the color values of the color samples included in the second set of color samples to generate a color value for the pixel.

6. The computer-implemented method of claim 1, further comprising:

determining that every stencil sample included in the first set of stencil samples is covered by the graphics primitive; and writing a compressed color value to a memory for the pixel that reflects the color value associated with the graphics primitive.

7. The computer-implemented method of claim 1, wherein the graphics primitive represents at least a portion of a path, and the path comprises at least a portion of a two-dimensional image to be rendered.

8. The computer-implemented method of claim 1, further comprising determining a first color value for a first color sample included in the second set of color samples in parallel with determining a second color value for a second color sample included in the second set of color samples.

9. The computer-implemented method of claim 1, wherein the one or more state values associated with each stencil sample in the first set of stencil samples includes at least one of a stencil value and a depth value.

10. The computer-implemented method of claim 1, wherein determining coverage of the first set of stencil samples relative to the graphics primitive comprises analyzing a sample output mask that is generated based on one or more per-sample tests.

11. The computer-implemented method of claim 1, wherein a first number of stencil samples within the pixel is an even multiple of a second number of color samples within the pixel.

12. The computer-implemented method of claim 1, further comprising combining the color values for each sample group included in the set of sample groups to compute a final color value for the pixel.

13. The computer-implemented method of claim 1, wherein each sample group is associated with a different color sample in a second set of color samples, and further comprising associating each stencil sample included in the first set of stencil samples with at least one color sample included in the second set of color samples.

14. A graphics processing unit configured to render a graphics image, comprising:

a memory; and a graphics processing pipeline coupled to the memory and configured to:

identify a first set of stencil samples that reside within a pixel stored in the memory, wherein each stencil sample in the first set of stencil samples is associated with one or more state values, determine coverage of the first set of stencil samples relative to a graphics primitive, group the first set of stencil samples into a set of sample groups, wherein the number of sample groups included in the set of sample groups is less than the number of samples included in the first set of stencil samples, and determine a color value for each sample group included in the set of sample groups based on the coverage of the first set of stencil samples relative to the graphics primitive and a color value associated with the graphics primitive.

15. The graphics processing unit of claim 14, wherein the graphics processing pipeline is configured to determine coverage of the first set of stencil samples by identifying stencil samples in the first set of stencil samples that are covered by the graphics primitive.

16. The graphics processing unit of claim 14, wherein the graphics processing pipeline is configured to reduce the first set of stencil samples to the second set of color samples by:

identifying a first region within the pixel;

determining a first subset of the first set of stencil samples that resides within the first region; and generating a first color sample to be included in the second set of color samples that corresponds to the first subset.

17. The graphics processing unit of claim 16, wherein the graphics processing pipeline is further configured to blend color values associated with the first color sample to determine a color value for the first color sample by:

determining a coverage fraction for the first subset that reflects a fraction of samples included in the first subset that are covered by the graphics primitive;

modifying a color value associated with the first color sample based on the coverage fraction and the color value associated with the graphics primitive.

18. The graphics processing unit of claim 14, wherein the graphics processing pipeline is further configured to downsample the color values of the color samples included in the second set of color samples to generate a color value for the pixel.

19. The graphics processing unit of claim 14, wherein the graphics processing pipeline is further configured to:

determine that every stencil sample included in the first set of stencil samples is covered by the graphics primitive; and write a compressed color value to the memory for the pixel that reflects the color value associated with the graphics primitive.

20. The graphics processing unit of claim 14, wherein the graphics primitive represents at least a portion of a path, and the path comprises at least a portion of a two-dimensional image to be rendered.

21. The graphics processing unit of claim 14, wherein the graphics processing pipeline is further configured to determine a first color value for a first color sample included in the second set of color samples in parallel with determining a second color value for a second color samples included in the second set of color samples.

22. The graphics processing unit of claim 14, wherein the one or more state values associated with each stencil sample in the first set of stencil samples includes at least one of a stencil value and a depth value.

23. The graphics processing unit of claim 14, wherein the graphics processing unit is configured to determine coverage of the first set of stencil samples relative to the graphics primitive by analyzing a sample output mask that is generated based on one or more per-sample tests.

24. A computing device, comprising:

a memory unit; and a processing unit coupled to the memory unit and including:

a graphics processing pipeline configured to:

identify a first set of stencil samples that reside within a pixel, wherein each stencil sample in the first set of stencil samples is associated with one or more state values;

determine coverage of the first set of stencil samples relative to a graphics primitive, group the first set of stencil samples into a set of sample groups, wherein the number of sample groups included in the set of sample groups is less than the number of samples included in the first set of stencil samples, and determine a color value for each sample group included in the set of sample groups based on the coverage of the first set of stencil samples relative to the graphics primitive and a color value associated with the graphics primitive.

25. The computing device of claim 24, wherein the graphics processing pipeline is configured to determine coverage of the first set of stencil samples by identifying stencil samples in the first set of stencil samples that are covered by the graphics primitive.

26. The computing device of claim 24, wherein the graphics processing pipeline is configured to reduce the first set of stencil samples to the second set of color samples by:

identifying a first region within the pixel;

determining a first subset of the first set of stencil samples that resides within the first region; and generating a first color sample to be included in the second set of color samples that corresponds to the first subset.

27. The computing device of claim 26, wherein the graphics processing pipeline is further configured to blend the color values associated with the first color sample to determine a color value for the first color sample by:

determining a coverage fraction for the first subset that reflects a fraction of samples included in the first subset that are covered by the graphics primitive; and modifying a color value associated with the first color sample based on the coverage fraction and the color value associated with the graphics primitive.

\* \* \* \* \*